United States Patent
Costin et al.

[11] Patent Number: 5,916,461
[45] Date of Patent: Jun. 29, 1999

[54] SYSTEM AND METHOD FOR PROCESSING SURFACES BY A LASER

[75] Inventors: Darryl J. Costin, Perrysburg; Clarence H Martin, Gahanna, both of Ohio

[73] Assignee: Technolines, LLC, Perrysburg, Ohio

[21] Appl. No.: 08/839,165

[22] Filed: Apr. 23, 1997

Related U.S. Application Data

[60] Provisional application No. 60/041,061, Feb. 19, 1997.
[51] Int. Cl.$^6$ .................................... B23K 26/00
[52] U.S. Cl. .................. 219/121.68; 219/121.69; 364/474.08
[58] Field of Search .......... 219/121.68, 121.69, 219/121.61, 121.62, 121.83; 8/444; 364/474.08

[56] References Cited

U.S. PATENT DOCUMENTS 5,567,207  10/1996  Lockman et al. ................ 8/444

FOREIGN PATENT DOCUMENTS 2294656  5/1996  United Kingdom .

OTHER PUBLICATIONS

"Micromachining Using Excimer Lasers" by Tonshoff, *Annals of the CIRP*, vol. 42 Jan. 1993, pp. 247–251.

*Primary Examiner*—Geoffrey S. Evans
*Attorney, Agent, or Firm*—Scott C. Harris, Esq.

[57] ABSTRACT

A laser system for processing surfaces of a variety of materials. The amount of laser treatment received is controlled by a probability distribution matrix that is programmed into a control computer. In particular, the control computer can control a scanning laser beam to simulate the statistically random property of the particle distribution in a sandblasting process to generate a feathered worn look.

16 Claims, 14 Drawing Sheets

| .6 | .6 | .5 | .4 | .3 | .3 | .2 | .1 | 0 | 0 | 0 | 0 |
| --- | --- | --- | --- | --- | --- | --- | --- | --- | --- | --- | --- |
| .8 | .8 | .7 | .6 | .5 | .5 | .3 | .2 | .1 | 0 | 0 | 0 |
| 1.0 | 1.0 | 1.0 | 1.0 | .8 | .7 | .6 | .3 | .2 | 0 | 0 | 0 |
| 1.0 | 1.0 | 1.0 | 1.0 | 1.0 | .9 | .8 | .7 | .3 | .1 | 0 | 0 |
| 1.4 | 1.2 | 1.0 | 1.0 | 1.0 | 1.0 | .9 | .8 | .4 | .2 | 0 | 0 |
| 1.6 | 1.4 | 1.2 | 1.0 | 1.0 | 1.0 | .9 | .8 | .4 | .2 | 0 | 0 |
| 1.8 | 1.6 | 1.4 | 1.2 | 1.0 | 1.0 | .9 | .8 | .4 | .2 | 0 | 0 |
| 2.0 | 1.8 | 1.6 | 1.4 | 1.2 | 1.0 | .9 | .8 | .4 | .2 | 0 | 0 |
| 2.0 | 1.8 | 1.6 | 1.4 | 1.2 | 1.0 | .9 | .8 | .4 | .2 | 0 | 0 |
| 1.8 | 1.6 | 1.4 | 1.2 | 1.0 | 1.0 | .9 | .8 | .4 | .2 | 0 | 0 |
| 1.6 | 1.4 | 1.2 | 1.0 | 1.0 | .9 | .8 | .7 | .4 | .2 | 0 | 0 |
| 1.4 | 1.2 | 1.0 | 1.0 | 1.0 | .9 | .8 | .7 | .4 | .2 | 0 | 0 |
| 1.2 | 1.0 | 1.0 | 1.0 | .9 | .9 | .8 | .6 | .4 | .1 | 0 | 0 |
| 1.0 | 1.0 | 1.0 | 1.0 | .9 | .9 | .8 | .6 | .3 | .1 | 0 | 0 |
| 1.0 | 1.0 | 1.0 | .9 | .8 | .7 | .6 | .5 | .3 | .1 | 0 | 0 |
| 1.0 | 1.0 | 1.0 | .9 | .8 | .8 | .6 | .4 | .2 | 0 | 0 | 0 |
| 1.0 | 1.0 | .9 | .8 | .8 | .6 | .4 | .3 | .2 | 0 | 0 | 0 |
| 1.0 | 1.0 | .9 | .8 | .8 | .6 | .4 | .2 | .1 | 0 | 0 | 0 |
| .8 | .8 | .6 | .4 | .4 | .3 | .3 | .2 | 0 | 0 | 0 | 0 |
| .6 | .6 | .4 | .4 | .3 | .3 | .3 | .2 | 0 | 0 | 0 | 0 |
| .3 | .3 | .3 | .2 | .2 | .2 | .1 | 0 | 0 | 0 | 0 | 0 |
| .4 | .4 | .3 | .3 | .2 | .2 | 0 | 0 | 0 | 0 | 0 | 0 |
| .3 | .3 | .2 | .2 | .2 | .1 | 0 | 0 | 0 | 0 | 0 | 0 |
| .9 | .8 | .7 | .4 | .2 | .1 | 0 | 0 | 0 | 0 | 0 | 0 |
| 1.0 | 1.0 | 1.0 | .6 | .4 | .2 | 0 | 0 | 0 | 0 | 0 | 0 |
| 1.8 | 1.6 | 1.0 | .9 | .8 | .2 | 0 | 0 | 0 | 0 | 0 | 0 |
| 2.0 | 1.8 | 1.6 | 1.0 | .8 | .2 | .1 | 0 | 0 | 0 | 0 | 0 |
| 1.8 | 1.6 | 1.0 | 1.0 | .9 | .3 | .2 | 0 | 0 | 0 | 0 | 0 |
| 1.0 | 1.0 | 1.0 | .80 | .6 | .3 | .2 | 0 | 0 | 0 | 0 | 0 |
| .9 | .8 | .6 | .4 | .3 | .3 | .2 | 0 | 0 | 0 | 0 | 0 |

SYSTEM AND METHOD FOR PROCESSING SURFACES BY A LASER

CROSS-REFERENCE TO RELATED APPLICATION

This application claims the benefit of the U.S. Provisional Application No. 60/041,061, titled "LASERBLAST PROCESS", filed by Clarence H Martin and Darryl J. Costin on Feb. 19, 1997, the disclosure of which is incorporated herein by reference.

FIELD OF THE INVENTION

The invention relates to a surface treatment with a laser, and more specifically, to a system and method for processing surfaces made of a variety of materials with at least one laser beam.

BACKGROUND OF THE INVENTION

A laser beam can interact with a surface in a number of ways to change the surface properties, including light absorption, photon scattering and impact. For example, a surface may be burned by an intense laser beam. Some surface particles may be ablated from a surface by the impact of a laser beam. Therefore, a surface can be treated with one or more proper lasers to achieve certain effects that may not be easily done with other methods.

One example is described in a copending U.S. patent application Ser. No. 08/729,493, titled "LASER METHOD OF SCRIBING GRAPHICS", which is a continuation-in-part of the U.S. patent application Ser. No. 08/550,339, filed on Oct. 30, 1995 by the present inventors. The disclosure of the application "LASER METHOD OF SCRIBING GRAPHICS" is incorporated herein by reference. This application describes the use of lasers to form graphics on various materials, including fabrics, leathers, vinyls, rubber, wood, metals, plastics, ceramics, glass and other materials. The graphics can be patterns, images, letters, and or any other visual marks.

Although other traditional methods, such as dyeing, printing, weaving, embossing and stamping, have been widely used, laser methods appear to have certain advantages in producing complex and intricate graphics on the materials. This is at least in part because many of the traditional methods lack the necessary registration and precision to insure that minute details of the graphics are accurately and repeatably presented on the materials. In addition, laser methods obviate many problems associated with the traditional methods such as high cost of equipment manufacturing, equipment maintenance, and operation, and environmental problems. A detailed description of laser methods for scribing graphics is disclosed by the present inventors in the above-referenced U.S. Patent Application "LASER METHOD OF SCRIBING GRAPHICS".

The extent of the laser interaction with a material can be characterized by a number of parameters including spot size, intensity, power, etc. The inventors found that one preferred parameter is the energy density per unit time ("EDPUT") defined as $$EDPUT = \frac{\text{laser power}}{\text{beam spot area}} \cdot \frac{1}{\text{projection speed}},$$

wherein the projection speed is the speed at which the scanning beam spot moves on a treated surface. The laser operational parameters, i.e., laser power, beam spot size, and the scanning speed, should be adjusted to achieve an optimal EDPUT for a specific material and a particular scribing requirement. If the EDPUT is too high, the surface may be carbonized, burned or melted; if the EDPUT is too low, the effect of laser treatment may not be sufficiently visible.

The inventors recognized that lasers can also be used to treat a material surface in order to achieve a certain texture or appearance of the surface. Many materials used by the fabric industry are treated for this purpose.

Denim fabrics may undergo a sandblasting process to obtain a worn look. Denim jeans are often sold with a worn look in the upper knee portions and back seat portion. The effect is similar to a feathered or shadowed look in which the degree of the worn look continuously changes along the length and width of the seemingly "worn" areas.

A conventional method to achieve this effect is to use a sandblast treatment to abrade the jeans with sand particles, metal particles or other materials at selected areas to impart a worn look with a desired degree of wear. This process blasts sand particles from a sandblasting device to a pair of jeans. The random spatial distribution of the sand creates a unique appearance in a treated area. Denim jeans and other clothing treated with such a sandblast process have been very popular in the consumer market.

However, the sandblast process has a number of problems and limitations. For example, the process of blasting sand or other abrasive particles presents significant environmental issues. A worker usually needs to wear protective gear and masks to reduce the impact of inhaling any airborne sand or other abrasive particles that are used. The actual blasting process typically occurs in a room which is shielded from other areas in a manufacturing facility. Further environmental issues arise with the clean-up and disposal of the sand. In practice, undesired sand is rarely completely eliminated from the pockets of the denim jeans or jackets.

The sandblasting process is an abrasive process, which causes wear to the sandblasting equipment. Typically, the actual equipment needs to be replaced as often as after one year of normal operation. This can result in added capital expense and installation.

In addition, the actual cost of the sandblasting process is estimated as high as several dollars per unit garment depending upon capacity utilization. This high cost is at least in part due to the labor involved, the cost of the equipment repair or continual purchase, the environmental clean-up required, the sand used, and actual yield of the goods.

Furthermore, the sandblasting process can adversely affect the strength and durability of the finished goods due to the abrasion of the sand or other particles that are used.

Despite the above problems and limitations, the sandblast process is still in wide use simply because there is no other alternative technique that can economically produce the desired surface appearance of the sandblast treatment. In view of the above, the inventors found it desirable to replace the sandblast process with a new environmentally friendly process which is capable of producing the "sandblast look" while reducing the cost and maintaining the durability of the finished goods.

In recognition of the above, the inventors invented laser scribing methods to achieve the worn look on fabrics such as denim, details of which are disclosed in the above incorporated U.S. Patent Application "LASER METHOD OF SCRIBING GRAPHICS". For example, one method is to drape the denim over a cone, cup or wedge surface that is positioned relative to a laser with a beam scanning device so that the focused beam projects different spot sizes at the different location of the surfaces due to a distance variation from the focusing distance. Thus, the beam intensity changes with the beam location on the surface. Accordingly, the degree of laser scribing or the EDPUT on a piece of fabric on the surface changes. The laser sweeps over the surface to scribe a predetermined pattern such as a solid pattern or a pattern with closely spaced lines. The locations on the surface that are closest to the focusing distance to the laser receive the highest beam intensity or EDPUT and hence have the more worn appearance. Conversely, the locations on the surface that are most out of the focusing distance experience the lowest beam intensity or EDPUT and hence have the least worn appearance. This technique has the effect of continuously changing the laser focus as the laser beam scribes a pattern on the material. Alternatively, the laser focus can be changed with respect to a flat work surface to achieve the same effect.

Another method previously disclosed by the inventors relies upon using a reference EDPUT grid over a treated area. Again, a pattern is scribed in the treated area on a material surface. However, the operating parameters of the scanning laser are changed along the grid with a predetermined EDPUT distribution to achieve a desired effect, such as a feathered look.

A third method uses a pattern having a series of lines with continuously increasing or decreasing line spacing and thickness to achieve the feathered or worn look. Alternatively, a radial gradient pattern can also be created by the scanning laser with a predetermined EDPUT to produce a desired fabric appearance.

The results of the above laser scribing techniques produced a "feathered" look that approximates the worn look achieved from the sandblast process. However, the treated fabric does not exactly replicate the well-recognized worn appearance produced by the sandblast process. This is at least in part due to the fact that the laser scribing techniques are essentially based on scribing with a regular pattern rather than the spatially random hits of the blasted sand or other abrasive particles. Also, the above laser methods usually have long processing cycle times. For example, a typical cycle time of 6 minutes or more is needed to process an oval section of 21 inches in length.

Another limitation is that laser scribing requires a certain pattern with certain laser operating parameters (e.g., EDPUT) for a particular fabric in order to create a worn look. Since this can change from one fabric to another, the methods are very material specific and are not universally applicable to different fabrics.

SUMMARY OF THE INVENTION

The present invention uses a laser system to simulate the worn look on a fabric surface produced by a sandblast process in an economic way.

This is accomplished, at least in part, by forming a random computer simulation of the appearance of a sandblasted fabric and using at least one laser beam to mark the material in the shape of the sandblasted fabric.

According to one embodiment of the invention, the laser system comprises a laser capable of producing light for processing surfaces, a laser power control capable of controlling the laser output level and turning on and off the output beam, a beam steering and scanning device, focusing optics, and a control computer. The control computer can be programmed to generate a probability density matrix based on a desired surface appearance. A random array of numbers indicating an amount of laser treatment is used to simulate the random aspect in the spatial distribution of the abrasive particles in the sandblasting process.

One aspect of the invention is the capability of controlling the geometric shape and dimension of an area to be processed. This is in part due to the accuracy and repeatability of laser processing.

Another aspect of the invention is the capability of controlling a feathering effect at the edges of the worn look of fabrics by an adjustment of a rate at which the probability distribution in the probability density matrix changes with positions.

Yet another aspect is to process a selected fabric area with multiple laser scans based on a predetermined probability distribution of a desired surface appearance.

BRIEF DESCRIPTION OF THE DRAWING

These and other aspects and advantages of the present invention will become more apparent in the light of the following detailed description of preferred embodiments thereof, as illustrated in the accompanying drawing, in which:

FIG. 5B is a computer generated laser processed elliptical pattern using the same probability matrix as in FIG. 5A with two laser scans according to the invention.

FIGS. 6A and 6B show computer simulated elliptical patterns with the density matrix of different roll-off rates in accordance with the invention.

FIG. 7A shows a computer simulated laser processed worn pattern for denim jeans.

FIG. 7B is a density matrix indicating the right-hand-side portion of the worn pattern of FIG. 7A.

FIG. 8A shows another computer simulated laser processed worn pattern for denim jeans.

FIG. 8B is a density matrix indicating the right-hand-side portion of the worn pattern of FIG. 8A.

DETAILED DESCRIPTION OF THE INVENTION

Figure 1:
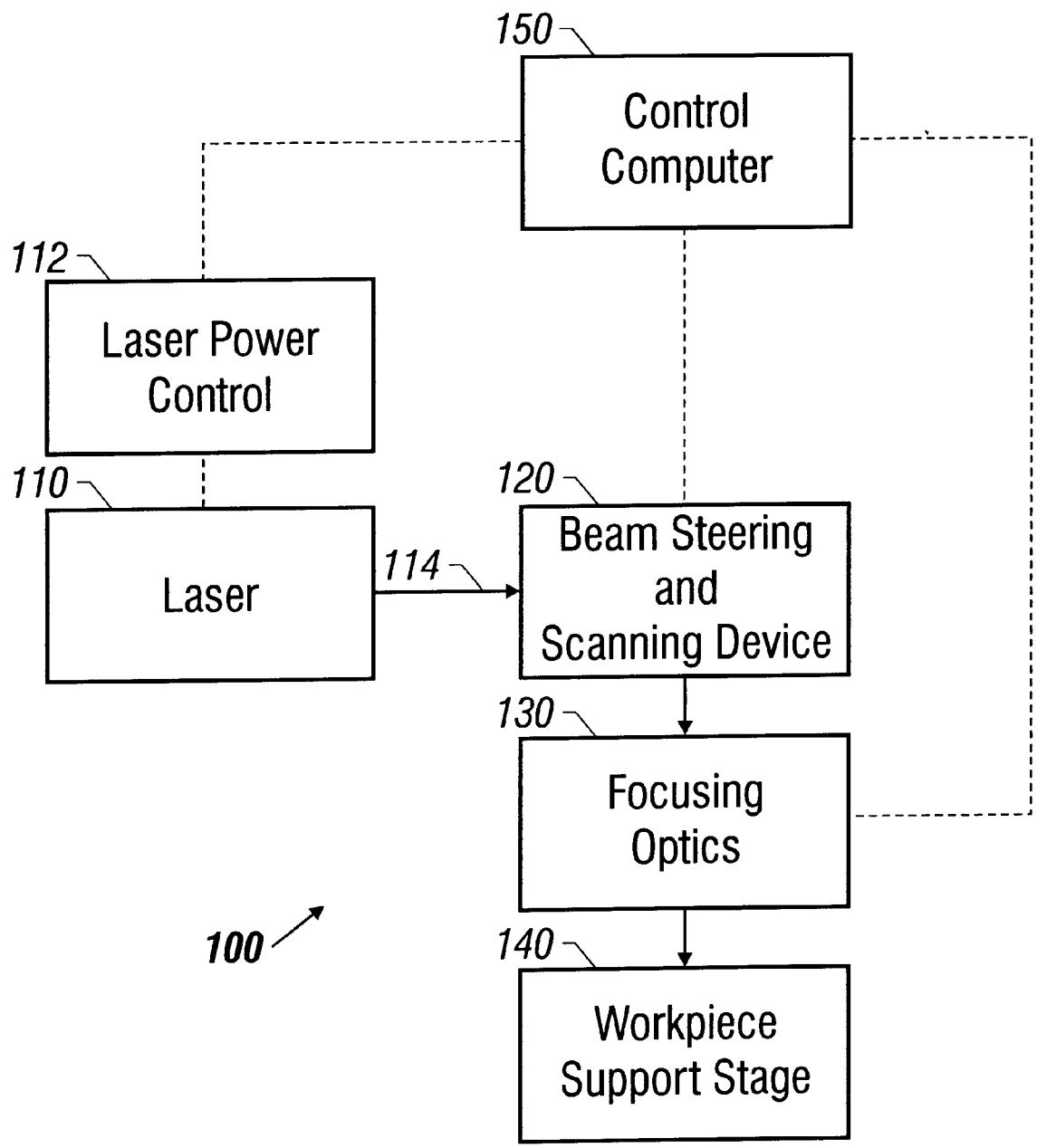
FIG. 1 is a block diagram showing a laser processing system for treating a surface of a workpiece in accordance with the invention.

FIG. 1 shows a block diagram of a laser processing system for treating a surface in accordance with the invention. Solid lines with an arrow represent laser beams and dashed lines represent electrical control signals. A laser 110 of any type, including but not limited to, a gas laser and a solid-state laser in CW or pulsed operation mode, produces a laser beam 114. A $CO_2$ laser may be preferred for processing many materials. The output power of the beam 114 is controlled by a laser power control unit 112. A beam steering and scanning device 120 is positioned relative to the laser 110 and is operable to guide the laser beam to any location on a workpiece surface held by a support stage 140. Focusing optics 130 is located at a desired distance from the support stage 140 relative to the beam steering and scanning device 120.

A control computer 150 is used to control the operation of the laser 110 including the output power, the steering and scanning of the laser beam, and the beam spot size on the support stage by changing the distance between the focusing optics 130 and the support stage 140. The control of the output power of the laser 110 includes turning on/off the laser beam, changing the output level, or other controls. Such a control can be done either by directly controlling the laser itself or by modulating the output beam with a electrically driven beam shutter and beam attenuator. Many aspects of these components are described in the above-referenced copending application "LASER METHOD OF SCRIBING GRAPHICS".

The beam steering and scanning device 120 can either direct the beam to any desired location on the support stage 140 or scan the beam over the support stage with a certain spatial sequence at a desired speed. Thus, the preferred system 100 in general can be used for scribing a pattern on a surface and treating a surface to achieve a certain appearance or achieving a combination of the both.

A preferred parameter for measuring the degree of laser interaction with a surface is the energy density per unit time ("EDPUT") as defined previously and as described in the above-referenced patent application, "LASER METHOD OF SCRIBING GRAPHICS". The EDPUT at the support stage can be determined by at least one of the following: the laser power control 112, the beam steering and scanning device 120 for the projection speed of the beam on the support stage 140, or the focusing optics 130 which changes the beam spot size. Therefore, a desired EDPUT distribution with a certain spatial profile can be achieved. This results in either scribing a graphic on a workpiece or producing a certain surface appearance. The computer 150 may have a plurality of programs for controlling the preferred system 100 to achieve these functions, which will be described in detail.

A variety of materials can be processed with the system 100, including but not limited to, fabrics, leathers, vinyls, rubber, wood, metals, plastics, ceramics, glass, and other materials. These materials can be used to make different goods. Some common examples include clothing, linens, footwear, belts, purses and wallets, luggage, vehicle interiors, furniture coverings, and wall coverings.

Figure 2:
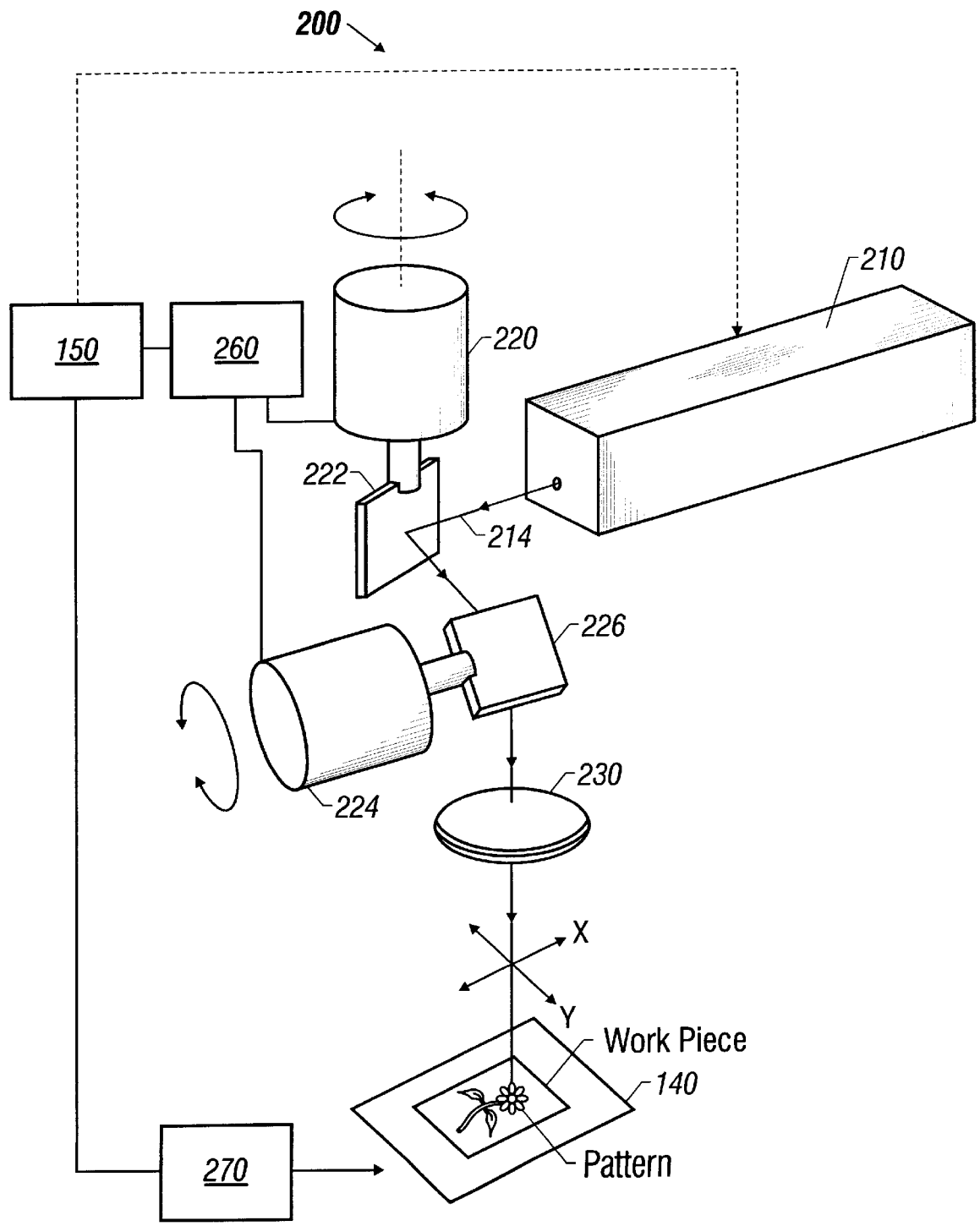
FIG. 2 shows an exemplary embodiment of the system of FIG. 1 with two galvo mirrors for scanning the laser beam on a workpiece surface.

FIG. 2 shows an exemplary implementation 200 of the system 100. A laser 210 can be a $CO_2$ laser or a YAG laser capable of producing different power outputs. An electrically controlled beam shutter (not shown) is included in the laser 210 to turn the beam on and off as desired. A CW $CO_2$ laser, "Stylus", manufactured by Excel/Control Laser (Orlando, Fla.) may be used as the laser 210.

The laser 210 generates a laser beam 214 in the direction of a computer controlled beam steering and scanning device having a first mirror 222 and a second mirror 226. The mirror 226 is mounted on a first galvanometer 220 so that the mirror 226 can be rotated to move the beam in a x-axis on the support stage 140. A second galvanometer 224 is used to control the mirror 226 so that the mirror 226 can move the beam on the support stage 140 along a y-axis. Therefore, galvo mirrors 222 and 226 can be controlled to scan the laser beam on the support stage to generate almost any trace and geometric shapes as desired. A galvanometer driver 260 receives commands including numerical control commands from the computer 150 and respectively controls the movement of each galvo mirror.

The laser beam 214 is deflected first by the x-axis mirror 222 and subsequently by the y-axis mirror 226 to direct the beam through a focusing lens 230. The lens 230 is preferably a multi-element, flat-field, focusing lens assembly, which is capable of optically maintaining the focused spot on a flat plane as the laser beam moves across the material. A movable stage (not shown) may be used to hold the lens 230 so that the distance between the lens 230 and the support stage 140 can be changed to alter the beam spot size. Alternatively, the support stage may be moved relative to the lens 230.

The support stage 140 has a working surface which can be almost any substrate including a table, or even a gaseous fluidized bed. A workpiece is placed on the working surface. Usually the laser beam is directed generally perpendicular to the surface of the support stage 140, but it may be desirable to guide the beam to the surface with an angle to achieve certain effects. For example, the incident angle may range between about 45° and about 135°.

The computer 150 may include a designated computer such as a workstation computer (not shown) to facilitate the formation of the desired graphic or a control matrix. For example, a graphic can be scanned into the workstation computer and converted into the proper format. This may expedite the processing speed. The computer 150 then controls the galvo mirrors to impart the desired pattern to a material at the appropriate EDPUT.

The system 200 may also include a gas tank 270 to inject a gas such as an inert gas into the working zone over the support stage 140. The amount of gas can be controlled by the computer 150. This use of an inert gas may reduce the tendency for complete carbonization, burn-through and/or melting. This technique can also produce new effects in graphics. In general, any gas can be used in the working zone to create a new effect. The gas tank 270 can also be used to inject a gaseous dye to add coloring on workpiece.

The above disclosed laser systems can be used to impart graphics and/or produce certain surface appearance on a surface of a variety of goods and products. In particular, the systems can be used to treat fabrics to have the worn appearance produced by the conventional sandblasting process. The present invention has a number of advantages over the conventional sandblast process. For example, the overall cost for the system hardware and operation maintenance is less expensive. The health hazards and environmental problems of the sandblasting process are essentially eliminated. The present invention can better preserve the durability of the treated materials than the sandblasting process. The product yield of the system of the invention is higher than that of the sandblasting process due to the accuracy and repeatability of the laser processing. In addition, the present invention not only can generate the sandblasted look on denim but also can impart the sandblasted look on khaki and other materials. Furthermore, precision control of the laser beam allow the preferred system of the invention to better control how a selected area will be treated while the sandblasting process simply cannot give a user much control. Yet another advantage of the invention is that laser surface treatment for a desired appearance can be easily combined with scribing complex and intricate graphics in the treated area since with the same processing system without relying on additional devices.

A first embodiment of the invention uses the computer 150 of the system 100 in FIG. 1 to produce a probability density matrix which is in turn used to create a impact frequency matrix. The impact frequency matrix is used to control the laser in producing a desired two-dimensional spatial profile or pattern. A selected area to be treated on a fabric or clothing is divided into a matrix of pixels. The impact frequency matrix indicates the number of times each individual pixel is "hit" by the laser beam.

The computer 150 uses the impact frequency matrix to generate a set of control codes for controlling the laser power control 112 and the beam steering and scanning device 120. The power control 112 keeps the laser beam 114 on as the beam scans locations on a fabric corresponding to pixels with positive impact frequencies and turns the laser beam off as the laser scans locations with zero impact frequencies.

Thus the laser beam 114 is turned on and off as it scans through a treated area of a desired geometric shape on a fabric. Multiple laser scans are needed at the locations that are to be hit by the beam more than once. Areas of a fabric having locations that are hit more frequently by the laser beam have a high degree of worn appearance. Conversely, the areas having locations that are hit by the laser beam less frequently will have a lesser degree of worn appearance. The final effect of the scan is equivalent to shining many laser beams simultaneously on the fabric with a random distribution similar to the basting of sand particles. For this reason, this laser surface treatment may be referred as a "laser blast" process which is analogous to the "sandblast".

The probability density matrix assigns a probability density to each pixel. This assignment of probabilities may be done mathematically for any number of regular geometric shapes, e.g., ellipses, rectangles, etc. Alternatively, the assignment of probabilities may be set manually and stored in a data file.

The impact frequency matrix is generated from the probability density matrix by using pseudo-random number generation with a computer. Many different patterns can be produced in accordance with the invention with each pattern having a different choice of the initial random number seed.

Assuming for the moment that the value of the probability density lies between 0 and 1 for each pixel, the process sets the likelihood of an impact for that pixel equal to the probability density. For example, if a pixel has a probability density of 0.6, it has a 60% chance receiving an impact of the laser beam and 40% of chances of not receiving an impact.

Probability densities greater than one are also used in this invention. In general, the integer portion of the probability density for a pixel indicates the minimum value of the impact frequency for that pixel. For example, a probability density of 2.4 for a pixel indicates that the pixel has a 40% of chances of receiving three impacts by the laser beam and a 60% chance of receiving two impacts.

According to the invention, the above technique can be extended to permit multiple passes in generating the impact frequency matrix. In this extension, the impact frequency matrix is generated cumulatively by two or more applications of the process described above using the same or different probability density matrices.

One advantage of this process is that it simulates the random nature of the impact of the abrasive particles impinging upon the fabric in a sandblasting process. This at least in part contributes to the much improved look by using the system of the invention over the effects by other laser methods previously disclosed.

Figure 3:
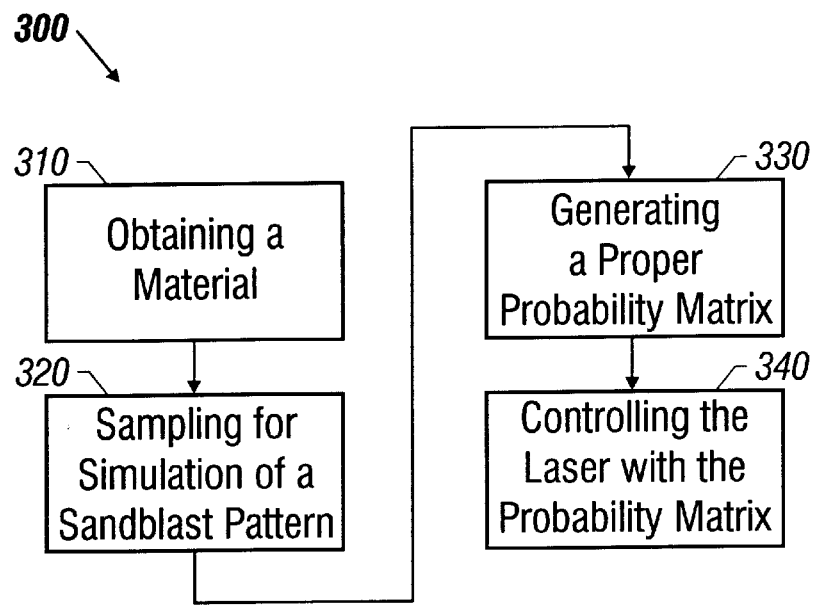
FIG. 3 is a flowchart showing one exemplary method in accordance with the invention.

FIG. 3 is a flowchart which shows a process of producing a desired sandblasted pattern on a fabric. First, at step 310, a sample of an actual sandblasted material is obtained. The surface appearance of the sample pattern is sampled at step 320 so that the exact locations and frequency that the sand particles hit are determined. Next at step 330, a probability density matrix is generated based on the sampling results of step 320 and a random number generation. The probability density matrix and corresponding impact frequency matrix are generated. The impact frequency matrix is subsequently used to control the laser beam at step 340 in treating a fabric to simulate the sandblasted appearance.

Figure 4:
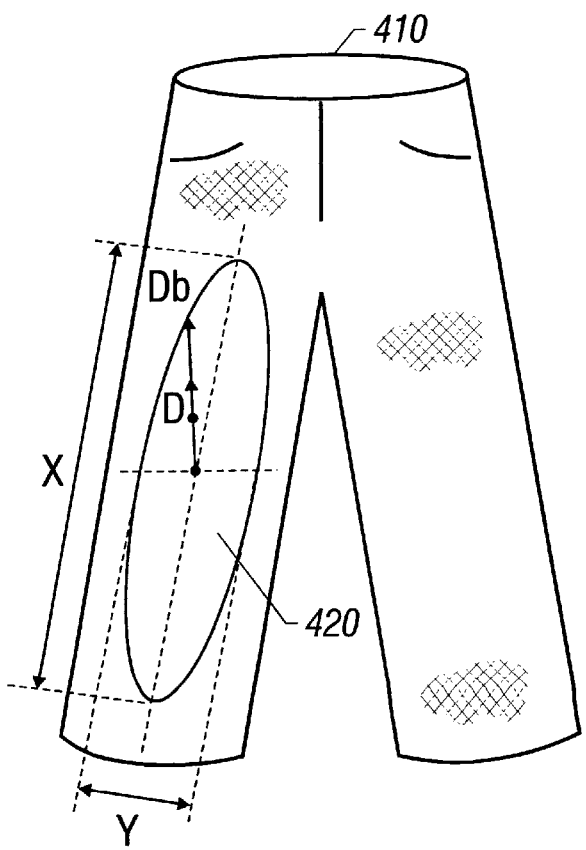
FIG. 4 shows an exemplary elliptical pattern with a worn look on a garment.

The mathematical approach to setting the values of the probability density matrix can be illustrated by an elliptical pattern as shown in FIG. 4. This is an effective way of creating an oval shaped wear pattern around the knee portion of a pair of denim jeans. An elliptical area 420 may be used for simplicity. In general, any geometrical shape may be used. Thus the desired replication of a sandblast pattern is one wherein the frequency of being hit by a laser beam is greatest in the center of the ellipse 320 and diminishes in a continuous but random manner when moving away from the center toward the boundaries. This is produced by a probability density matrix that has the highest probability value in the center of the ellipse and values that decrease continuously in a predetermined manner when moving toward the boundaries.

The method to produce such a probability density matrix begins with the assignment of the X and Y dimensions of the ellipse as indicated in FIG. 4, the probability density at the center O of the ellipse 420 is represented by a and the probability density at the boundary is represented by b which is set to be a constant at any point on the boundary in this example. Then the probability density of a pixel, such as indicated by point D can be determined by the ratio, R, of the distance from the ellipse center O to D to the distance from the center O to a point $D_b$ on the boundary at which the same vector as D intersects with the ellipse 420:

$$R = \frac{OD}{OD_b}$$

The probability density for the point D is then determined as follows:

Probability density=$a+R^P(b-a)$
where the exponent coefficient, p, determines the "roll-off" or the rate of fade in the worn look. For example, for p>1, the roll-off may be considered fast; for p=1, the roll-off is moderate; and for p<1, the roll-off is slow.

Figure 5A:
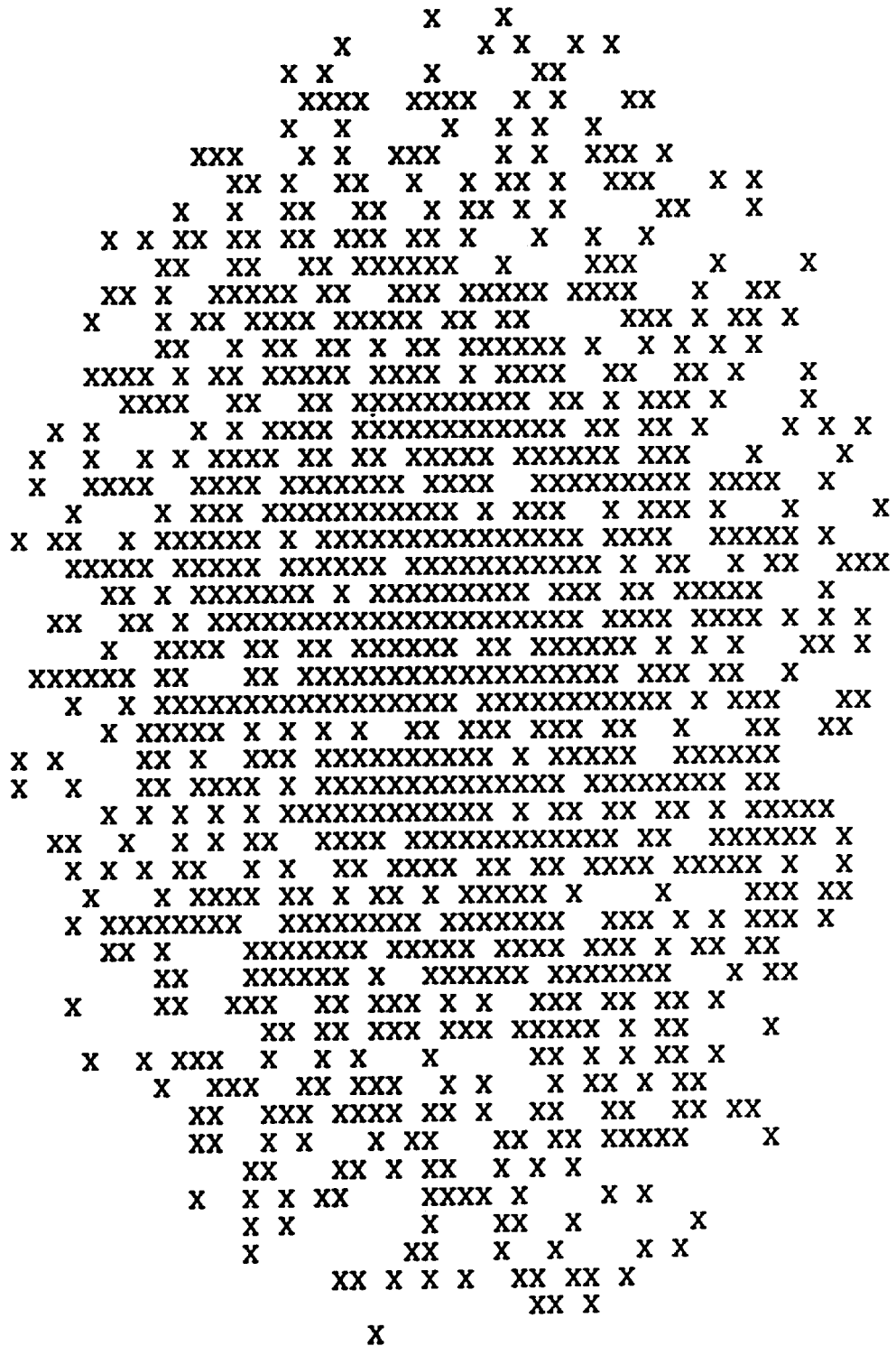
FIG. 5A is a computer generated laser processed elliptical pattern with a single scan according to the invention.
Figure 5B:
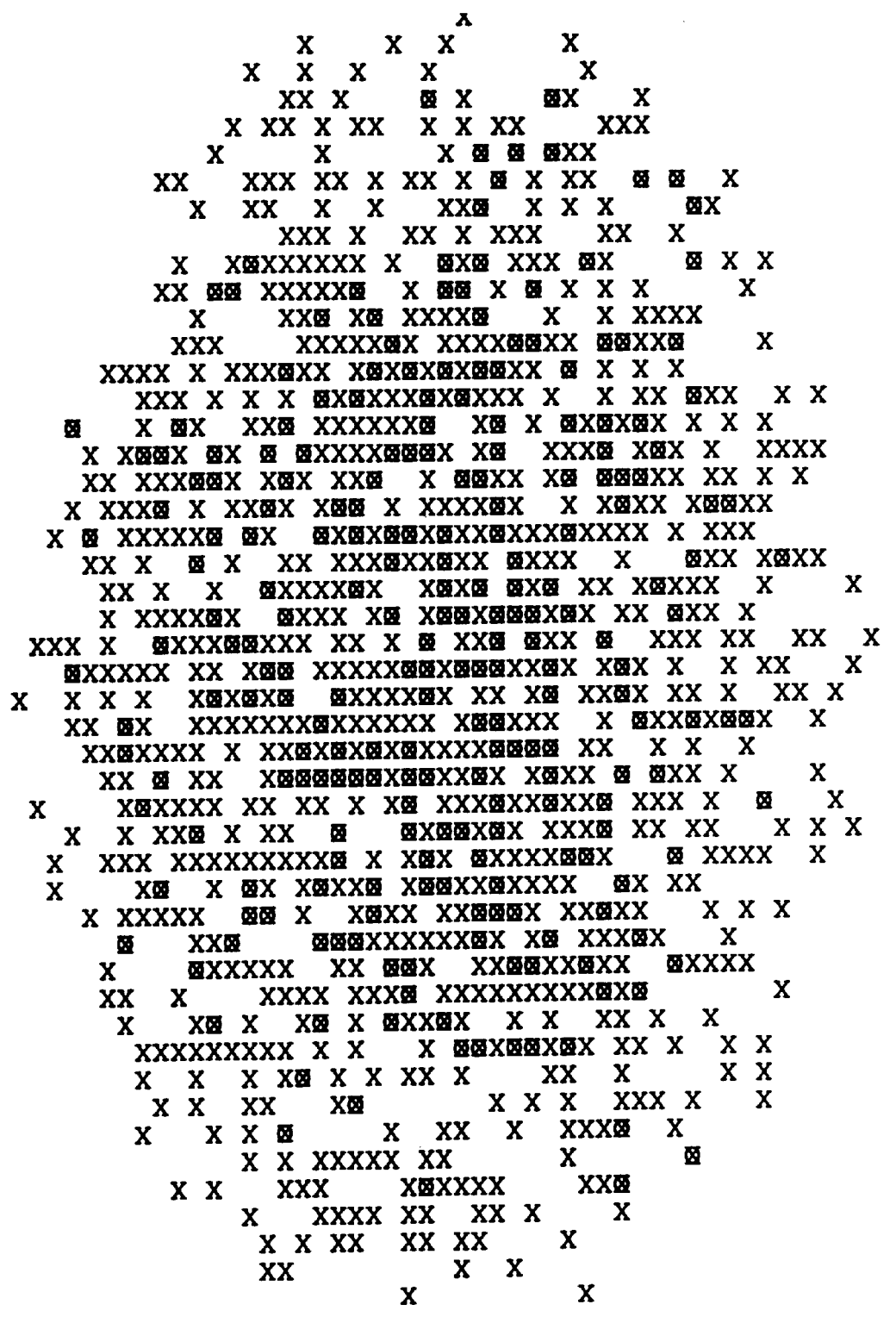

FIG. 5A shows a computer generated laser blast pattern of an ellipse created by setting the center probability density a=0.9, the boundary probability density b=0.1, and the roll-off coefficient p=1, for a single pass process. FIG. 5B shows a pattern with a, b and p set as in FIG. 5A but using a two-pass process.

Figure 6A:
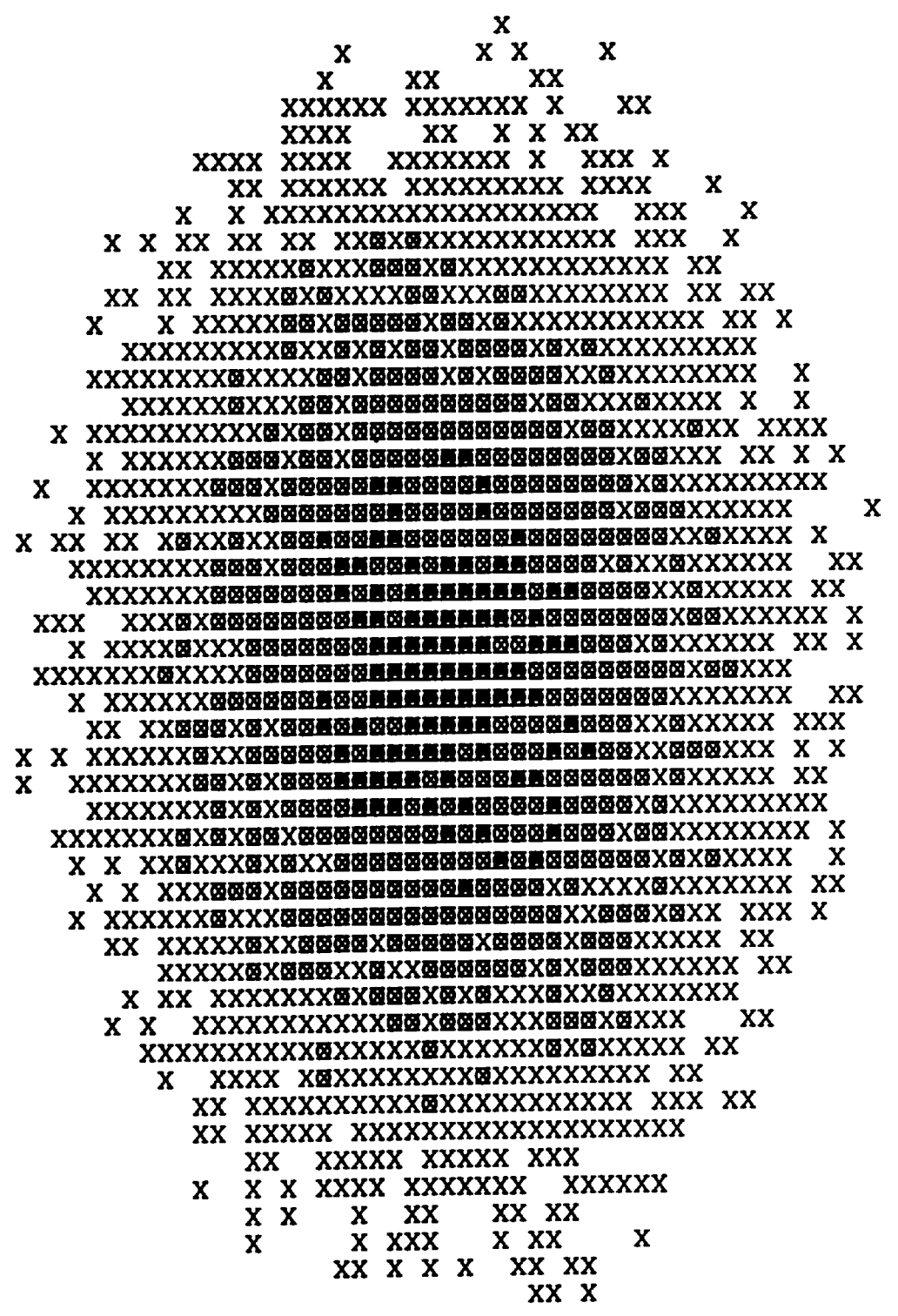
Figure 6B:
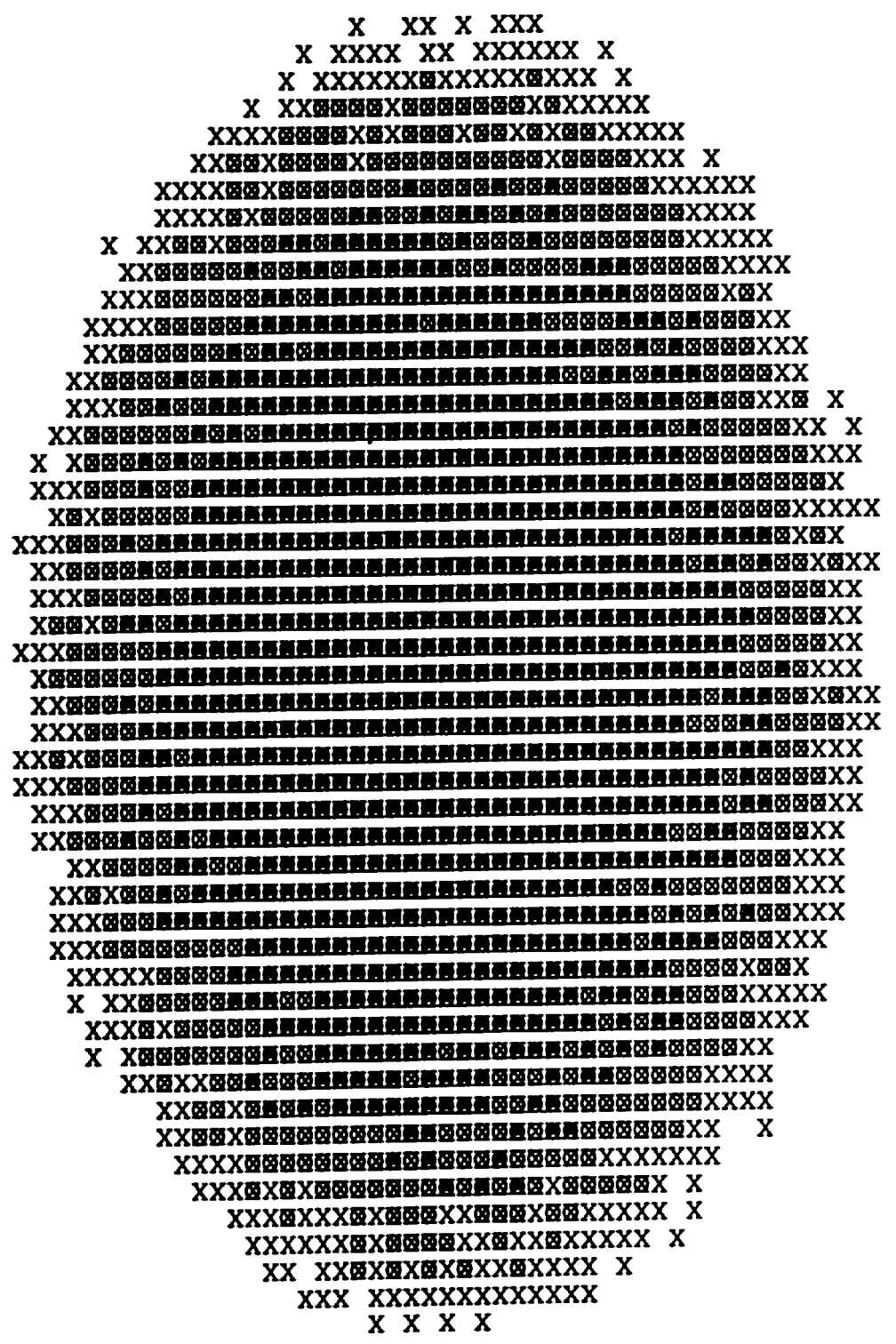

FIGS. 6A and 6B show computer generated laser blasted patterns of an ellipse with a maximum probability density at the center of 3.2 and a probability density of 0 at the boundary. FIG. 6A is generated by a roll-off coefficient p=2 and FIG. 6B is generated by a roll-off coefficient p=0.5. The significance of the roll-off is clearly shown by the difference in outer edge distributions. Thus, the roll-off can be used to precisely control the feathering effect.

Figure 7A:
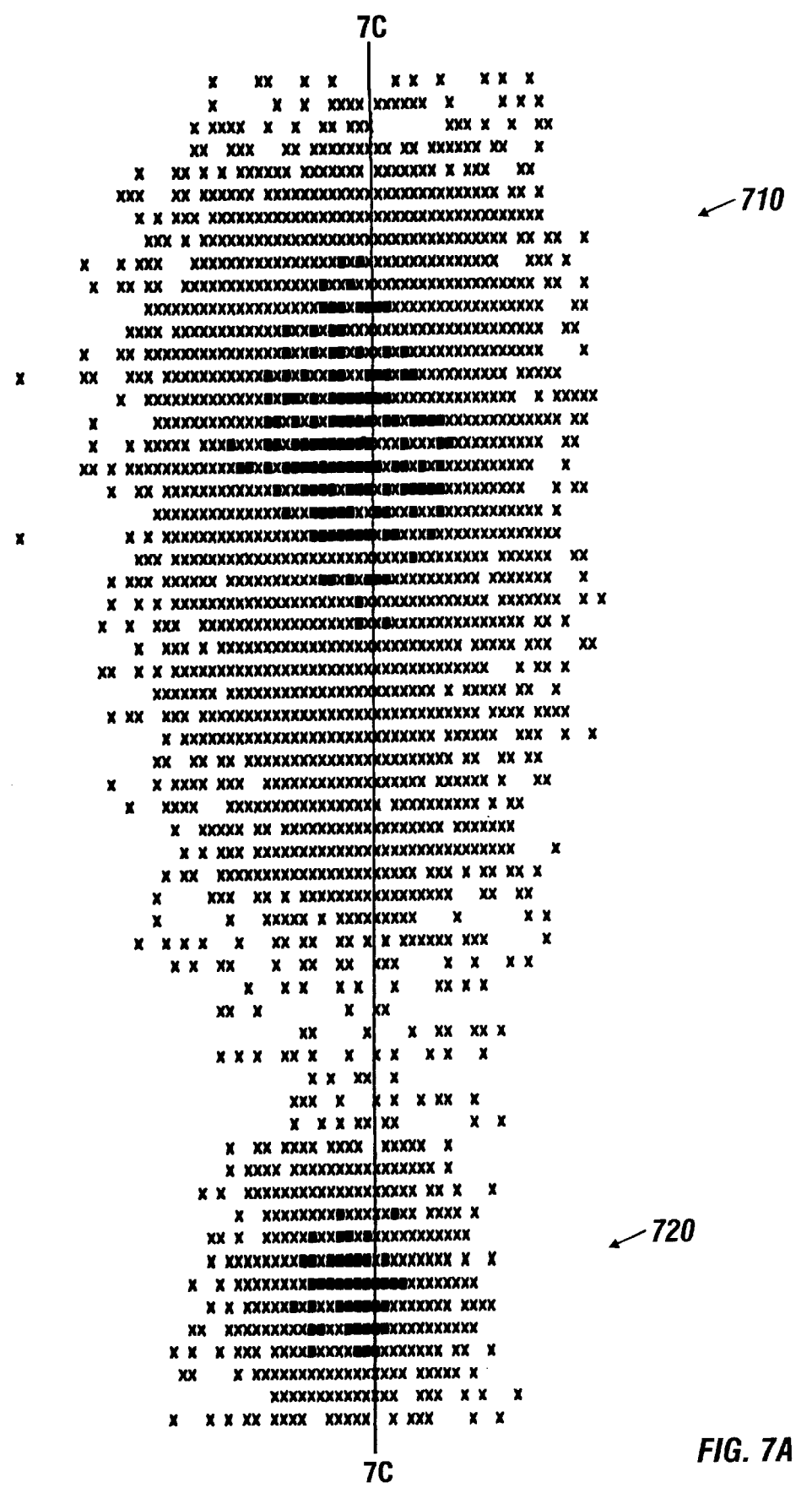

According to the invention, more complex patterns may be formed by manually setting the values of the probability density matrix and storing them in a data file. FIG. 7A shows a computer generated pattern having an upper portion 710 and a lower portion 720. The upper portion 710 may be used for the worn look on the lap portion of denim jeans and the lower portion 720 may be used for the worn look in the knee area. This is one of the popular worn looks on many jeans.

FIG. 7B shows the probability density matrix in a tabular form for the laser blasted pattern of FIG. 7A. The highest probability density is 2.0. Notice that FIG. 7B only shows the probability density matrix for the right-hand-side portion of the laser blasted pattern. The laser blasted pattern of FIG. 7A is symmetric about the line 7C—7C.

Figure 8A:
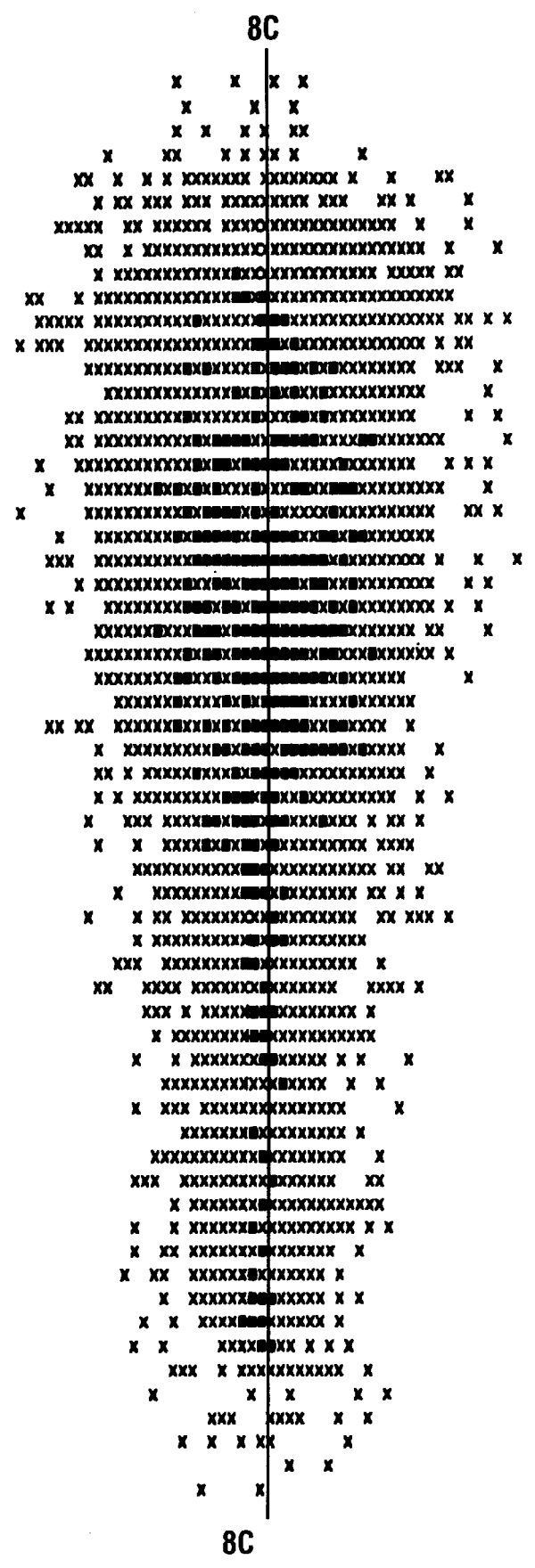
Figure 8B:
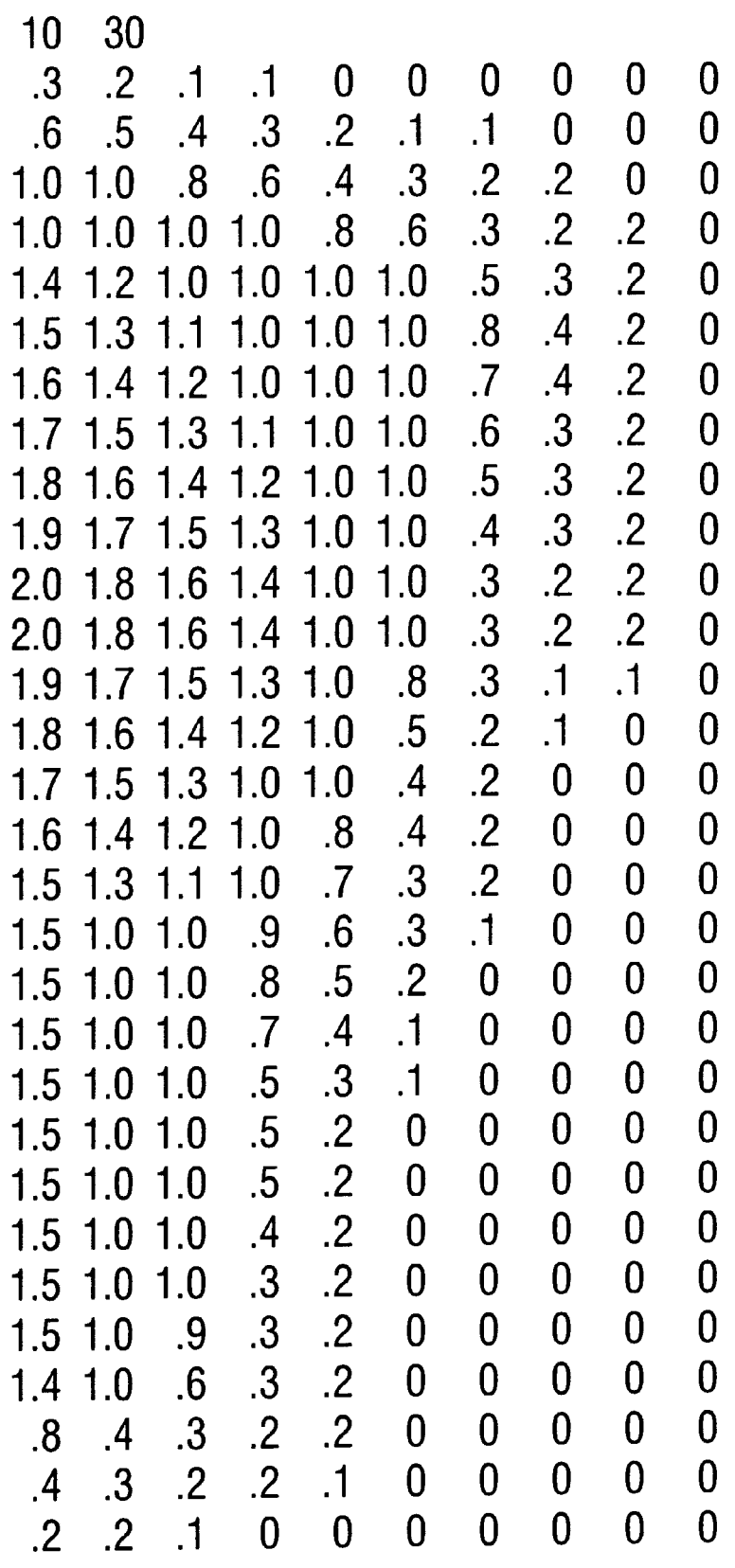

Another laser blasted pattern generated in accordance with the invention is shown in FIG. 8A. The respective probability density matrix for the right-hand-side portion is listed tabular form in FIG. 8B.

The spatial orientation of the pattern on the fabric may be adjusted by setting various operating parameters of the laser through either hardware or software implementation. For example, the density of the pixels and the angle of the scan may be set in such a manner.

According to a second embodiment, the impact frequency matrix may be implemented by keeping the laser beam on at the locations that have positive impact frequencies and adjusting operating parameters to increase EDPUT in accordance with the impact frequency, i.e., locations with higher impact frequencies are given higher values of EDPUT. Referring to FIG. 1, EDPUT can be adjusted by changing combinations of the following: the output power level with the power control 112, the scan speed by the beam scanning device 120, the relative distance between the focusing lens 130 and the support stage 140. The EDPUT values used in this embodiment are preferably within a range determined for each material. If the received EDPUT exceeds a maximum limit of the range, the surface may be burned or carbonized. Conversely, the effect of the laser processing may become imperceivable if the received EDPUT is smaller than a minimum limit of the range.

Therefore, one way to change the EDPUT based on the impact frequency matrix is to correlate the EDPUT of the laser system with the impact frequency in a linear or nonlinear relation. For example, if the center of the ellipse 420 has a probability of 1 assigned by the probability matrix, the corresponding impact frequency matrix will set the EDPUT value of the laser beam at the center to the maximum EDPUT in the allowed EDPUT range for that material. The areas with the lowest impact frequencies assigned by the impact frequency matrix may be set to receive the minimum EDPUT in the allowed EDPUT range. At the boundary of the ellipse 420, the probability is 0 and hence the minimum EDPUT value is assigned. Other ways of correlating the probability matrix and the EDPUT values of the laser system may also be used in accordance with the invention.

Test results with this new and novel technique demonstrated the possibility of nearly exactly simulating the worn look achieved from the sandblast process. The results were particularly encouraging because to the best knowledge of the inventors never before has there been a process that can achieve such a look other than the sandblast process.

One aspect of the impact frequency matrix in accordance with the invention is the scalability. An impact frequency matrix of a pattern can be scalable with the dimension of the pattern. This scaling technique may be used to reduce the processing cycle time of a large pattern. For example, the cycle time to process a typical 21-inch oval section from the upper thigh to below the knee on a pair of denim jeans was about at least 6 minutes for a set of operating parameters. The cycle time may be, however, reduced by the following scaling process.

First, an impact frequency matrix is generated for a pattern proportionally smaller than the desired size by a predetermined factor (e.g., a factor of 2). This is configured in a scanning control program in the control computer 150 of the system 100 of FIG. 1. For a given areal density of scanning lines, the processing cycle time of the smaller section is shorter than that of the desired larger section with the same pattern.

Secondly, the scanning control program is set to change the size command to increase the size of the image to the desired size that has been reduced in the first step. For example, if the pattern size used in the first step was ½ of the original size, then the height command in the laser file would be set to 2, i.e., twice as large. This effectively scales an impact frequency matrix for the smaller section to process a larger section of the same pattern.

Next, the EDPUT is adjusted (e.g., increased) so that a high scanning speed setting can be used to further reduce the cycle time for the desired finishing quality.

The effect of the above scaling technique is to make the laser traverse the pattern section at the same number of scanning passes as in the case for a pattern of a smaller (e.g., half) of the size while still keeping the laser scans relatively congruent. An optional step of adjusting the beam spot size may be performed after the resizing step of the scanning control program, in which the spot size of the laser beam 114 is increased to a predetermined diameter by adjusting the relative distance between the focusing optics 130 and the support stage 140. The amount of increase in the beam size usually has a relation with the size reduction factor used in the first step. For denim and some other fabrics, this optional step may not be necessary because of the fabric tolerance of the denim.

A significant reduction in the processing cycle time can be achieved by optimizing the operating parameters, including but not limited to, the scaling factor, the amount of increase in the beam size, the laser scanning speed, and the power of the laser. In processing an 21-inch oval, for example, the processing cycle time can be reduced by six folds from about 6 minutes to about 1 minute with a scaling factor of 2.

Another aspect of the impact frequency matrix technique is that the impact frequency matrix can be easily configured to generate a variety of different surface looks including different degrees of wearing in the sandblasted worn look. For example, an impact frequency matrix can be generated to produce a variety of pixelated looks and looks as if a shotgun pellets or other media were blasted onto the fabric. This can be accomplished by merely changing the probability densities within a boundary of a desired pattern. For example, probability densities at the center and boundary of the previously-described elliptical pattern in FIG. 4 can be changed for different looks. In addition, various graphics can be superimposed in a laser blasted section using the same laser system. A graphic may be scribed onto a selected area of a fabric first and then the laser blasted process is performed to achieve a desired worn effect on the scribed graphic.

Few surface processing techniques, including the sandblasting process and the previously disclosed laser techniques, are capable of providing the flexibility, diversity, and the precise control of the preferred matrix technique of the present invention.

Figure 9A:
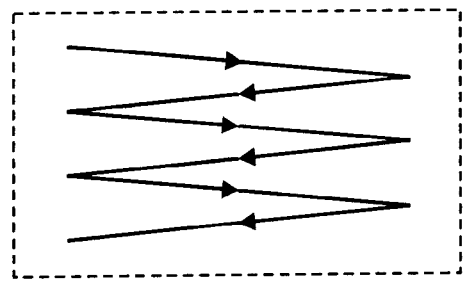
FIGS. 9A–9D are schematics showing different exemplary laser scanning traces in accordance with the invention.
Figure 9B:
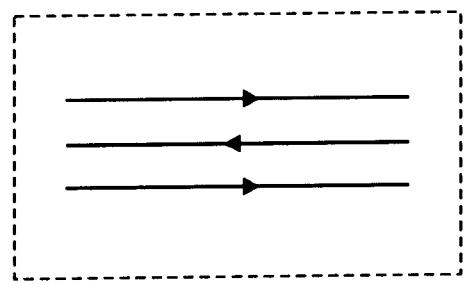
Figure 9C:
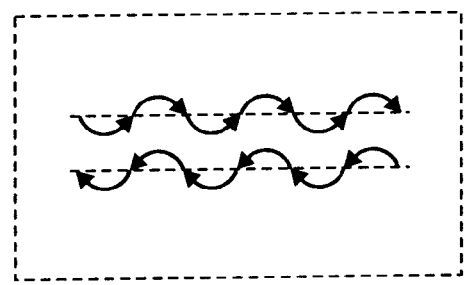
Figure 9D:
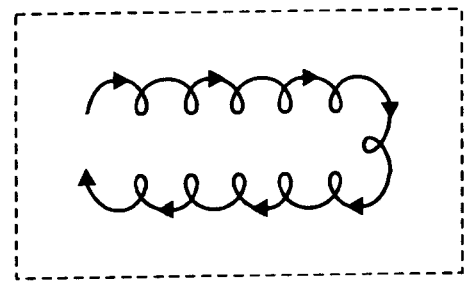

According to the invention, multiple laser scanning passes are performed in treating a selected section of a surface. In general, any beam scanning scheme may be used in accordance with the invention. For example, a commonly used line scanning scheme may be used to scan a surface in a line-by-line manner with each scanning line being a substantially straight line. FIGS. 9A and 9B show two examples of scanning in straight lines. The inventors discovered that non-straight scanning lines may also be used to achieve certain surface appearance that may not be possible with straight scanning lines. In particular, scanning in non-straight lines may be used to enhance the feathering effect on a fabric. Referring to FIG. 1, the beam steering and scanning device 120 and/or the focusing optics 130 may be controlled with the control computer 150 so that the trace of the scanning beam on a surface forms a certain waveform pattern. FIG. 9C shows a sine or cosine type scanning line. FIG. 9D shows "wobbling" scanning lines. Two adjacent wobbling lines may or may not overlap with each other. The wobbling scanning lines can be used in the scaling technique to compensate for the increased scanning spacing due to the increase in the size of an area to be processed.

Figure 10A:
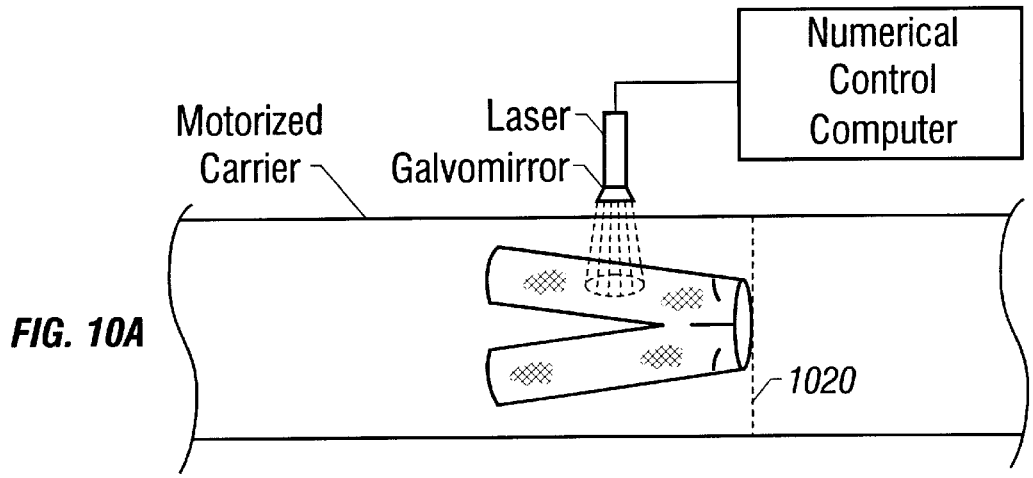
FIGS. 10A–10C are schematics illustrating three examples of laser precessing system for a garment production line.
Figure 10B:
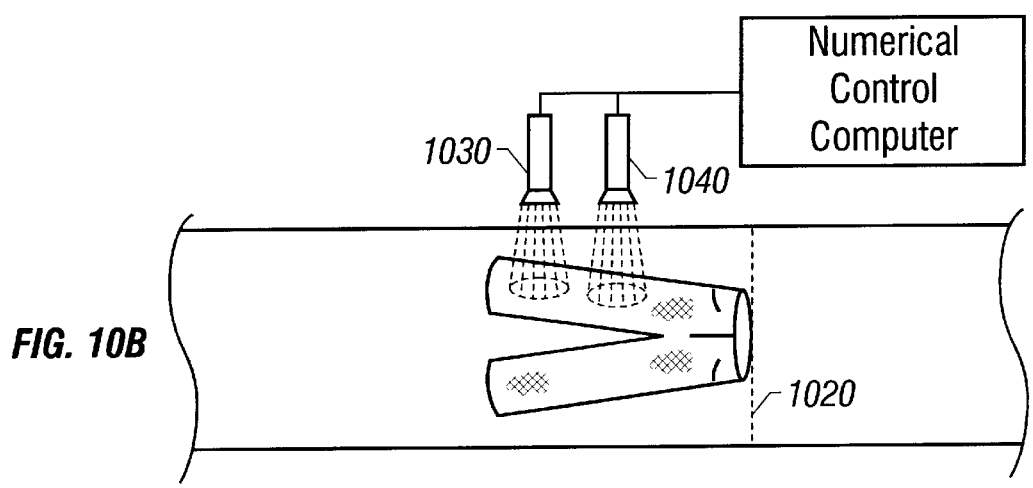
Figure 10C:
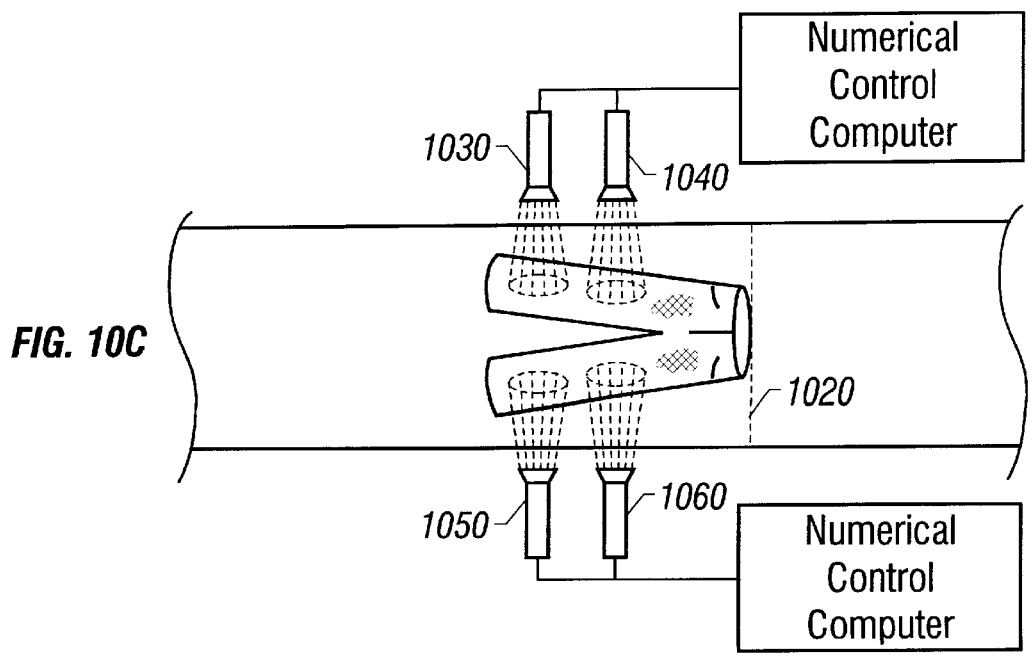

FIGS. 1 and 2 generally show laser processing systems for scribing graphics and treating surface on a workpiece. These systems can be used for processing denim jeans or other garments. FIGS. 10A–10C illustrate three examples of a laser processing system for denim jeans. A motorized carrier 1010 (e.g., an assembly line) provides an automated way for feeding denim jeans one by one to a processing location wherein the laser system is located. An autosizer 1020 having automatic sizing sensors to detect the actual size of the garment so that a proper location can be determined to impart either a graphic or a worn look. FIG. 10A shows a single laser beam used to process one section at a time. Multiple laser beams can be used to simultaneously process multiple sections on a pair of denim jeans to increase the processing speed of the system (FIGS. 10B and 10C). For example, lasers 1030 and 1040 are shown to produce two beams for simultaneously processing two different sections on a pair of jeans. The lasers can be positioned on top of a table with a laser beam impinging upon the fabric approximately in a vertical direction or the lasers can be positioned so that a laser beam impinges upon the fabric approximately in a horizontal direction.

Figure 11:
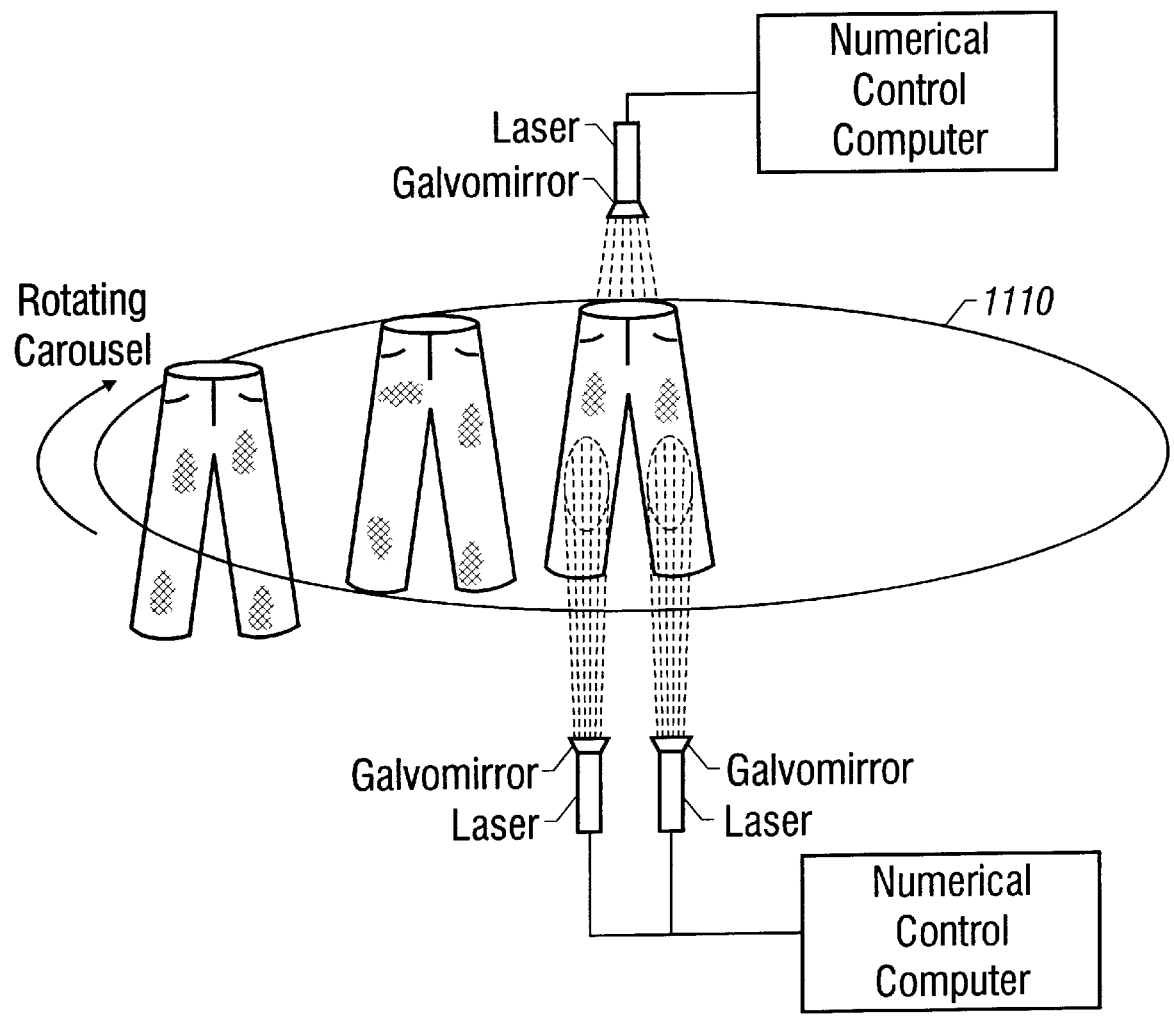
FIG. 11 shows a laser processing system with a rotating garment carousel and multiple lasers.

FIG. 11 shows another laser processing in system accordance with the invention. A motorized rotating carousel 1110 is used so that the jeans draped over a form can be automatically fed to a processing location. One or more laser beams can be used to simultaneously process one or more sections on a pair of jeans. The example of FIG. 11 shows that the front legs and back panels are being processed as the rotating carousel 1110 indexes the garment for subsequent processing.

Another aspect of the invention is that the laser processing process could be used after the garments are sewn and washed, or before they are sewn and washed.

Although the present invention has been described in detail with reference to the preferred embodiment, one ordinarily skilled in the art to which this invention pertains will appreciate that various modifications and enhancements may be predictable. For example, the support stage 140 in the system 100 of FIG. 1 can be movable by a motor controlled by the control computer 150 so that a fixed laser beam can be used for scribing graphics or creating a worn look since a fabric can be moved relative to the laser instead.

For another example, the single output beam 114 from the laser 110 may be split into multiple beams and each of the multiple beams can be independently controlled with a set of beam steering and focusing devices. Therefore, the multiple beams from the single laser may be used to simultaneously process different sections of a garment.

Furthermore, two independently-controlled scanning laser beams may be used simultaneously to process a same section of a garment with one scribing a graphic and another one producing a desired worn look. This may also increase the throughput of the system.

These modifications and others are intended to be encompassed by the following claims.

What is claimed is:

1. A sandblasting simulating apparatus, comprising:
    a laser;
    a material marking surface, having a surface adapted in operation to hold a material to be marked;
    a driving element, operating to steer an output of said laser on said material according to an applied command; and
    a controller, storing probability information for at least a plurality of areas on the material to be marked, said probability information indicating a sandblasted pattern to be applied to said material, and including information indicating a probability that said position will be marked by the laser to simulate said sandblasted pattern, and said controller commanding said driving element and said laser to operate according to said probability to produce more laser output in higher probability areas than in lower probability areas, to produce said sandblasted pattern on said material.

2. An apparatus as in claim 1, wherein said driving element steers an output of said laser on said material with a plurality of scans according to said command to produce said sandblasted pattern.

3. An apparatus as in claim 1, wherein said controller is operable to control an output energy level of said laser according to said probability.

4. An apparatus as in claim 1, wherein said controller is operable to turn on and off said an output laser beam from said laser according to said probability.

5. A method of simulating a sandblasting effect on a material to be marked, comprising
    placing a material to be marked on a support stage where said material will be marked by a controllable laser;
    obtaining a desired sandblast pattern to be formed on said material, and obtaining information indicating said sandblast pattern, to be formed on said material, said information indicating for each area of said material, whether said controllable laser will or will not mark on said material;
    using said information to control said laser to mark on said material to simulate said sandblasting effect; and
    controlling said laser so that a beam produced by said laser marks a wave-like trace on said material.

6. A method of simulating a sandblasting effect on a material to be marked, comprising:
    placing a material to be marked on a support stage where said material will be marked by a controllable laser;
    obtaining a desired sandblast pattern to be formed on said material, and obtaining information indicating said sandblast pattern, to be formed on said material, said information including a probability matrix of change to said material which includes a function of a distance on each area on said material from a reference point;
    using said information to control said laser to mark on said material according to said probability matrix to simulate said sandblasting effect, by:
        determining a distance of each area on said material from said reference point, determining a probability of laser strike by using said distance to obtain a value from said probability matrix, and controlling said laser according to said probability of laser strike.

7. A method as in claim 6, wherein said determining information step comprises sampling a sandblasted material and determining where changes to said material occur, and using said controllable laser to cause changes to said material.

8. A method as in claim 6, wherein said probability is a value indicating a number of times of strike by said laser beam, each whole value indicating a number of strikes of said laser beam, and a decimal value indicating a percentage value of strike on another pass of said laser beam.

9. A method as in claim 6, further comprising changing a resolution of operation of said laser beam to change a time to mark said material.

10. A method as in claim 9, wherein changing said resolution step further includes:

determining a location of a second desired sandblast pattern that is proportionally larger than said desired sandblast pattern by a predetermined dimension factor; and controlling said controllable laser according to a probability density matrix indicative of said sand blasting effect for said desired sandblast pattern and based on said predetermined dimension factor to mark said second desired sandblast pattern.

11. A laser surface processing system for processing a surface of a work piece, comprising:

a laser operable to produce a laser beam;

a beam steering device, disposed relative to said laser to receive said laser beam and operable to steer and scan said laser beam in a predetermined manner;

a support stage having a marking surface for holding said work piece to be marked by said laser beam; and a control computer, electrically connected to said laser and said beam steering device, said control computer being programmed to control said laser beam based on a probability matrix a pattern to be imparted to said work piece wherein said probability matrix has a Pseudo-random property which can be used to simulate an effect in a sandblasting process.

12. A system as in claim 11, wherein said laser has a controllable output energy level, and said laser comprises a beam controlling element operating to turn on and off said laser beam.

13. A system as in claim 11, further comprising focusing optics disposed relative to said beam steering device and spaced from said surface on said support stage by a predetermined distance, said focusing optics operable to focus said laser beam.

14. A system as in claim 13, wherein said focusing optics and said support stage can be spatially adjusted relative to each other.

15. A system as in claim 11, wherein said impact frequency matrix has a positioning dependence with respect to a reference in said pattern.

16. A system as in claim 11, wherein said control computer is further operable to control said laser for scribing graphics on said work piece according to a graphic scribing command, said graphic scribing command and said probability matrix being operable in a combination to control said laser beam.

* * * * *